United States Patent
Cooper

(10) Patent No.: US 6,581,981 B2
(45) Date of Patent: Jun. 24, 2003

(54) PIPE-FITTING WITH FLEXIBLE SLEEVE AND CINCHING NUT

(76) Inventor: Gary W. Cooper, 2952 Degen Dr., Bonita, CA (US) 91902

( * ) Notice: Subject to any disclaimer, the term of this patent is extended or adjusted under 35 U.S.C. 154(b) by 0 days.

(21) Appl. No.: 09/886,351

(22) Filed: Jun. 20, 2001

(65) Prior Publication Data

US 2002/0041098 A1 Apr. 11, 2002

Related U.S. Application Data

(63) Continuation-in-part of application No. 09/558,876, filed on Apr. 26, 2000, now abandoned.

(51) Int. Cl.[7] ............................................. F16L 17/00
(52) U.S. Cl. ..................... 285/354; 285/353; 285/34; 285/92; 285/917
(58) Field of Search ..................... 285/34, 354, 92, 285/353, 302, 917

(56) References Cited

U.S. PATENT DOCUMENTS

| | | | | | |
|---|---|---|---|---|---|
| 1,745,954 A | * | 2/1930 | Raybould | ................... | 285/208 |
| 1,814,480 A | * | 7/1931 | Metcalf, Jr. et al. | ........ | 285/323 |
| 1,882,223 A | * | 11/1932 | Lorehn | ........................ | 277/550 |
| 3,476,414 A | * | 11/1969 | Condrac | ..................... | 285/349 |
| 3,714,712 A | * | 2/1973 | Hoffmann | ...................... | 30/95 |
| 4,469,122 A | * | 9/1984 | Meek | .......................... | 137/312 |
| 4,471,978 A | * | 9/1984 | Kramer | ..................... | 285/321 |
| 4,630,851 A | * | 12/1986 | Ogawa | | |
| 5,195,785 A | * | 3/1993 | Jellison | ....................... | 285/80 |
| 5,782,500 A | * | 7/1998 | Mate | ........................... | 285/24 |

* cited by examiner

Primary Examiner—Lynne H. Browne
Assistant Examiner—G. M. Collins
(74) Attorney, Agent, or Firm—Henri J. A. Charmasson; John D. Buchaca

(57) ABSTRACT

A female fitting for pipes or tubes, particularly indicated for use in cramped quarters and under highly restrictive environmental conditions, has a split front section threaded with tapered translation-type threads. A hex-nut with commensurate and similarly tapered threads is used to cinch the split front section over an engaging pipe or tube. A circular groove within the fitting can nest an O-ring or other sealing collar. A flange with flattened parallel peripheral zones surround the fitting for reinforcement and to provide a convenient clamping surface. A cutting tool with dual pairs of cutting wheels is used to score two parallel channels around the end of the pipe or tube to receive a first sealing-ring made of compressible material and a second made of the same material as the pipe or tube.

3 Claims, 5 Drawing Sheets

PIPE-FITTING WITH FLEXIBLE SLEEVE AND CINCHING NUT

PRIOR APPLICATION

The present application is a Continuation-In-Part of copending U.S. application Ser. No. 09/558876, filed Apr. 26, 2000 now abandoned, fully incorporated herein by this reference an in which priority is claimed.

FIELD OF THE INVENTION

This invention relates to fluid fittings for connecting tubes and pipes and, more particularly, to pressure fittings that can be disconnected and re-used.

BACKGROUND OF THE INVENTION

Fittings are commonly used to connect metal or plastic tubes and pipes to each other in a variety of applications such as in the aerospace industry to convey fuel, hydraulic control fluids and the like in an aircraft, on board ship, in construction, in water systems or in a space vehicle. These types of tubes and pipes are commonly laid into narrow and crowded areas alongside other pipes and electrical wiring. The use of pipe and tube fittings during original installation, retrofitting or repair operations can be very difficult and time consuming and may be subject to environmental restrictions in terms of working space, maximum heat tolerance, the presence of potentially explosive gases, and prohibition against corrosive smoke, fume or abrasive fluxes.

It is well-known that the quality of a weld joint depends a lot upon the skill of the welder. Even a highly skilled welder may not be able to perform at his best when working in a cramped space under some of the restrictive conditions described above. This is why swaged joints are favored. However, swaging tools such as the one described in U.S. Pat. No. 5,305,510 Croft et al.; U.S. Pat. No. 5,308,394 Hyatt et al.; and U.S. Pat. No. 5,592,726 Suresh are bulky and may not be appropriate for use in cramped quarters.

In many systems, fluid pressures and temperatures can vary greatly between and even during duty cycles. Fluid temperature variations will cause both pipe and tube fittings to expand and contract. The disproportionate expansion of adjacent structures can lead to leakage or other degredation of the joint. Many of the prior art designs mentioned are not specifically made to be reusable, making repairs, adjustments and replacements even more costly.

This invention results from attempts to develop a new type of pipe and tube fitting particularly adapted for use under very restrictive environmental and space conditions, which is reusable and which can accommodate dynamic fluctuations in fluid temperatures and pressures.

SUMMARY OF THE INVENTION

The principal and secondary objects of this invention are:

To provide a non-chemical and re-usable fitting for joining tubes and pipes that can create a highly reliable joint without requiring special skills, bulky specialized or special post-installation testing can be installed in extremely cramped quarters and without generating any heat, smoke, fumes or effluents that could be detrimental to workers or the surrounding equipment;

To provide a joint that can withstand high degrees, and large variation in temperature and pressure;

To provide for the connection of pipe or tube components without requiring precise alignments or adjustments, and which can even be installed blindly in very awkward or hard to reach spaces; and To provide a non-bulky, simple-to-use tool and method of use for installing an improved joint on existing piping.

These and other valuable objects are achieved by a fitting comprising a female coupling to be engaged by the end of a pipe or tube, and having an axially split wall and tapering, threaded outer surface. A commensurately threaded nut is used to cinch the split segments of the coupling upon the pipe end. A first O-ring, collar or other similar sealing component is provided in order to either provide additional sealing power, or to accommodate slight differences in the geometry or diameters of pipes or tubings. A reinforcing ring or flange is provided at the end of the threaded section of the coupling to act as both a stop point for the nut and a grabbing surface for a wrench, pliers, vise or hands. An additional pair of sealing components is provided for placement in a pair of channels scored onto the pipe or tube end. A first sealing ring of resilient material provides an effective seal against low pressure leaks. A second sealing ring made of the same material as the pipe or tube is provided to prevent unacceptable deformation of the coupling wall, to more closely match the thermal expansion of the fitting, and to provide for a decrease in pressure during high pressure leakage. An adjustable tool for scoring the pipe in-situ has two pair of cooperating scoring wheels. Each wheel has a pair of parallely spaced apart circular scoring bits.

DESCRIPTION OF THE PREFERRED EMBODIMENT OF THE INVENTION

Figure 1:
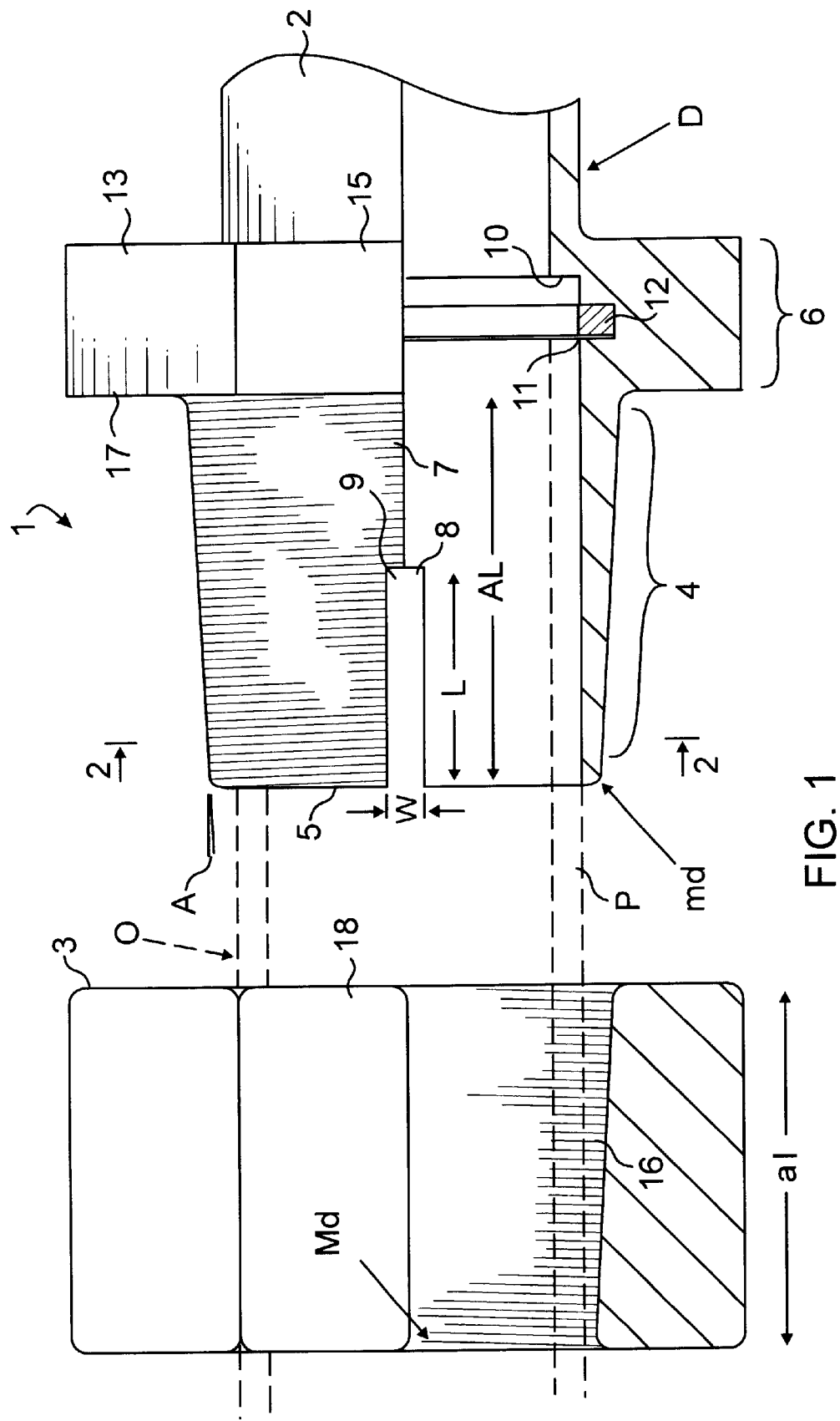
FIG. 1 is a side elevational and partial cross-sectional view of a first embodiment the female coupling and nut components of the fitting.
Figure 2:
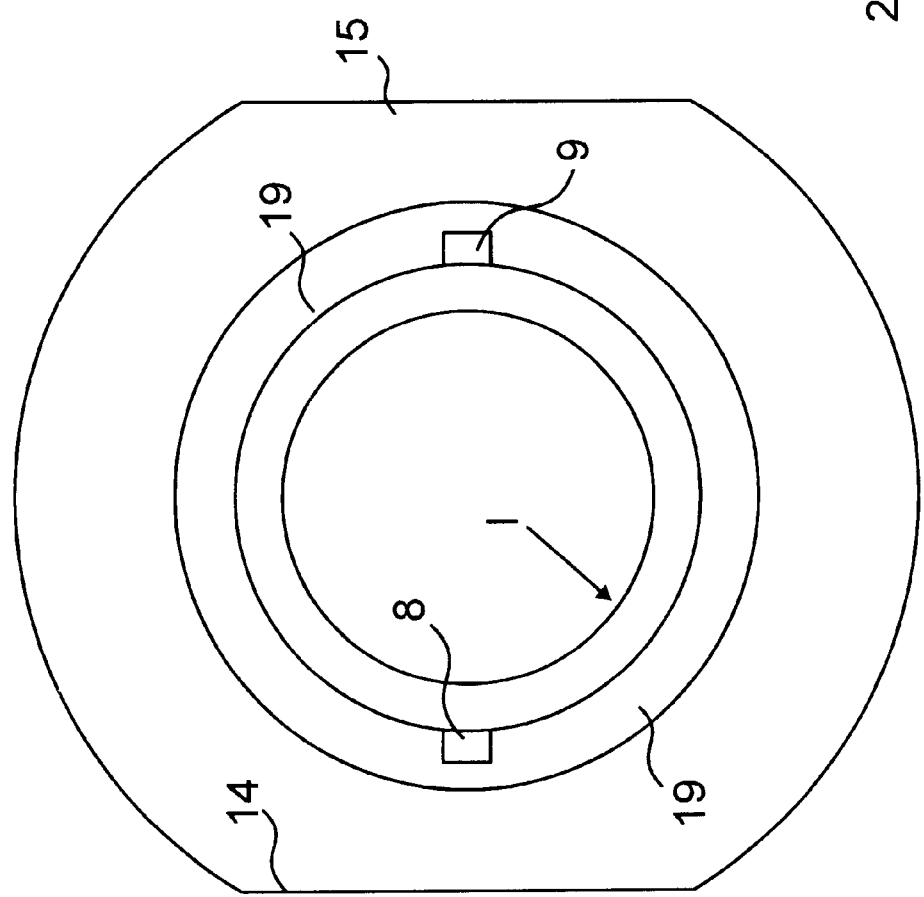
FIG. 2 is a cross-sectional view of the split end taken along line 2—2 of FIG. 1.

Referring now to the drawing, there is shown in FIGS. 1 and 2, a first embodiment of a fitting 1 integrally cast or otherwise formed at the end of a pipe 2 having a given outside diameter D, and a mating coupling hex nut 3.

The fitting 1 comprises a proximal region 4 defined between an opening 5 to be engaged by the end portion of a pipe of the same gage as the pipe 2 upon which the fitting is mounted up to a distal region 6 integrally formed with the end of pipe 2. The outer surface of the proximal region carries a thread 7 tapering down toward the opening 5, and having a given taper angle A and a given axial length L. Two diametrically opposed slots 8, 9 of given length l and width w are cut axially into the proximal section to a distance slightly less than the axial length AL of the female thread 7. The internal diameter I of the fitting is constant and slightly larger than the outer diameter O of the pipe P (shown in broken lines) to be received therein. The furthermost region of the distal end proximate the area where the fitting turns into the pipe 2 has the same inside diameter as the pipe P. Accordingly, a small radial barrier 10 is formed at that spot against which the end section of the pipe engaged into the opening 5 can come to rest. A circular groove 11 is cut into the inner wall of the distal section and is shaped and dimensioned to nest an optional sleeving 12 such as an O-ring that might be useful in compensating for variations in the outer diameter of certain tubings. A circular flange 13 projects radially from the outer surface of the distal section. The flange has two opposite and parallel flat peripheral zones 14, 15 which may be used to immobilize the fitting and associated pipe by means of a wrench, vise or pliers.

The hex nut 3 has a inner, female tapered thread 16 which is matingly commensurate with the male thread 7.

Rather than using one of the traditional American Standard pipe threads, it has been found more advantageous to use a translating thread type, such as an American Standard Modified square thread, an American Standard Acme General Purpose Thread, an American Standard 29-Degree Steel Thread or a 20-Degree Worm Thread. Although translating thread types are more troublesome to cut and are not favored on pipes and fittings, they have been found more effective in resisting external pressure forces. In order to provide an adequate cinching of the slotted front end of the proximal portion, the small end minor diameter md is slightly smaller than the small end major diameter Md of the nut. Alternately, the axial length AL of the male thread 7 can be slightly greater than the axial length al of the female thread 16. In either case, the proximal face 17 of the flange is located at the maximum excursion point of the nut's distal face 18, at which point, the cinching of the slotted segments 19 of the proximal end of the fitting will apply sufficient pressure upon the end portion of the engaged pipe to provide a solid and reliable coupling. Consequently, no torquing gage or any other special tools other than a wrench is required to quickly connect the fitting to a pipe.

Figure 3:
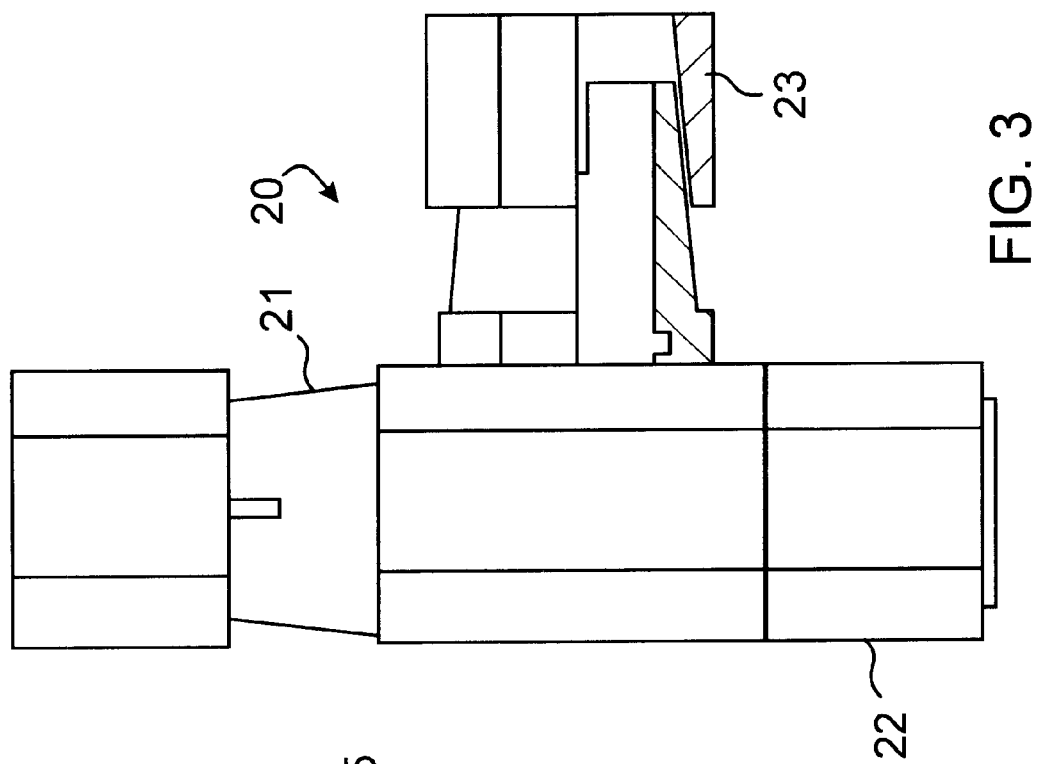
FIG. 3 is a side view of a T-coupling according to the invention.

As illustrated in FIG. 3, a T-coupling 20 can be integrally formed with three fittings 21, 22, 23 of the type just described.

Depending upon the application, the female fitting according to the invention may be made of a variety of plastic and metals such as stainless steel, aluminum, copper/nickel, copper, titanium, steel and a variety of alloys commonly used in the making of pipes and tubes of a wide variety of gauges. The sealing ring 12 is particularly useful in conjunction with galvanized pipes whose outside diameter is subject to wide variations.

In a typical example of an embodiment of the invention, the fitting 1 was integrally formed at the end of a one-inch OD Monel tube with an inside diameter I of 0.930 inch, two slots of 0.4 inch length l and 0.062 inch width w, an axial thread length AL of 0.98 inch, a 29-Degree stub Acme taper thread was used with a 3° taper angle A and a pitch of 16 TPI. The mating female thread of the nut had an axial length of only 0.9 inch. The small end minor diameter md of the male thread was 1.05 inch and the small end major diameter Md of the female thread was 1.15 inch. This coupling was tested at pressures of 300 PSI and 1500 PSI for eight hours without detectable leakage.

Figure 4:
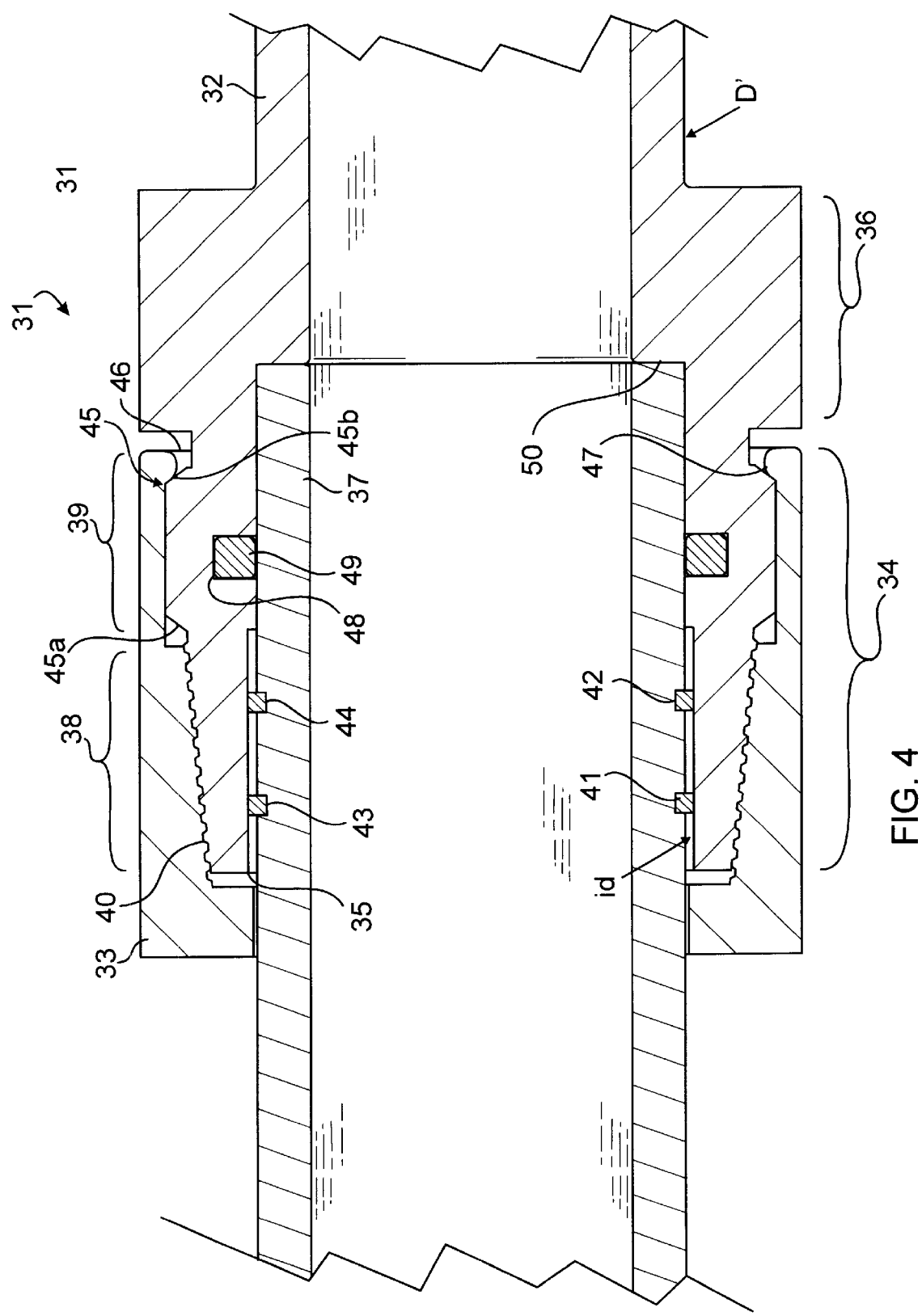
FIG. 4 is a partial cross-sectional side view of a second embodiment of the fitting.

A second embodiment of the invention, as illustrated in FIGS. 4, similar to the first embodiment shows a fitting 31 formed at the end of a pipe or tube 32 having a given outside diameter D', and a mating coupling hex nut 33. Similarly, the fitting engages the end portion 37 of a connecting pipe of the same gauge as pipe upon which the fitting is mounted. The fitting comprises a proximal section 34 and a distal section 36. However, in this embodiment the opening 35 has an inner diameter id slightly larger than the outer diameter D' of the pipe to accommodate a pair of circular sealing rings 41 and 42 mounted within a corresponding pair of circumferential channels 43, 44 formed into the outer surface of the end of the pipe 37. The proximal section comprises a threaded region 38 and a collared region 39 wherein the sealing rings are located radially inward from a threaded region 38. The outer surface of the threaded region carries a thread 40 tapering down toward the opening matingly commensurate with the inner threads of the nut 33 similar to the previous embodiment.

The collared region 39 provides a circular collar 45 projecting radially from the outer surface of the collared region. The distal opening 46 of the nut 33 has a rounded radially inward projecting lip 47. The collar has two opposite beveled edges 45a, 45b which allow the nut lip to ride over the collar and resiliently snap back upon and rest against the distal beveled edge 45b in order to enhance axial immobilization of the nut relative to the fitting.

A circular groove 48 is cut into the inner wall of the collared region of the proximal section and is shaped and dimensioned to nest an optional sleeving 49 such as an O-ring made from durable resilient material such as high temperature synthetic rubber in order to compensate for variations in the outer diameter of certain tubings. Similarly to the previous embodiment, a small radial barrier 50 is formed at that spot against which the end section of the pipe engaged into the opening 35 can come to rest.

The first most proximally located sealing ring 41 is preferably an O-ring made from durable resilient material such as a high-temperature synthetic rubber, which provides for sealing against low pressure leaks. The second sealing ring 42 is preferably a split O-ring made from durable, substantially non-compressible material so as to resist radial hyper-compression of the threaded region when the nut is tightened thereon to enhance reusability. This feature also avoids hyper-deformation of the resilient first sealing ring and is made of the same material as the pipe or tube and the fitting in order to prevent galvanic imbalance, provide the same thermal expansion coefficient as the pipe or tube and fitting.

This second sealing ring 42 enhances the fitting's overall sealing quality against high pressure leaks. Due to its stronger material, high pressure fluids do not damage this ring, and are reduced in pressure as they escape around it or through the split gap. By the time fluids encounter the first sealing ring, they are reduced in pressure to a degree in which the first sealing ring will prevent leakage.

Figure 5:
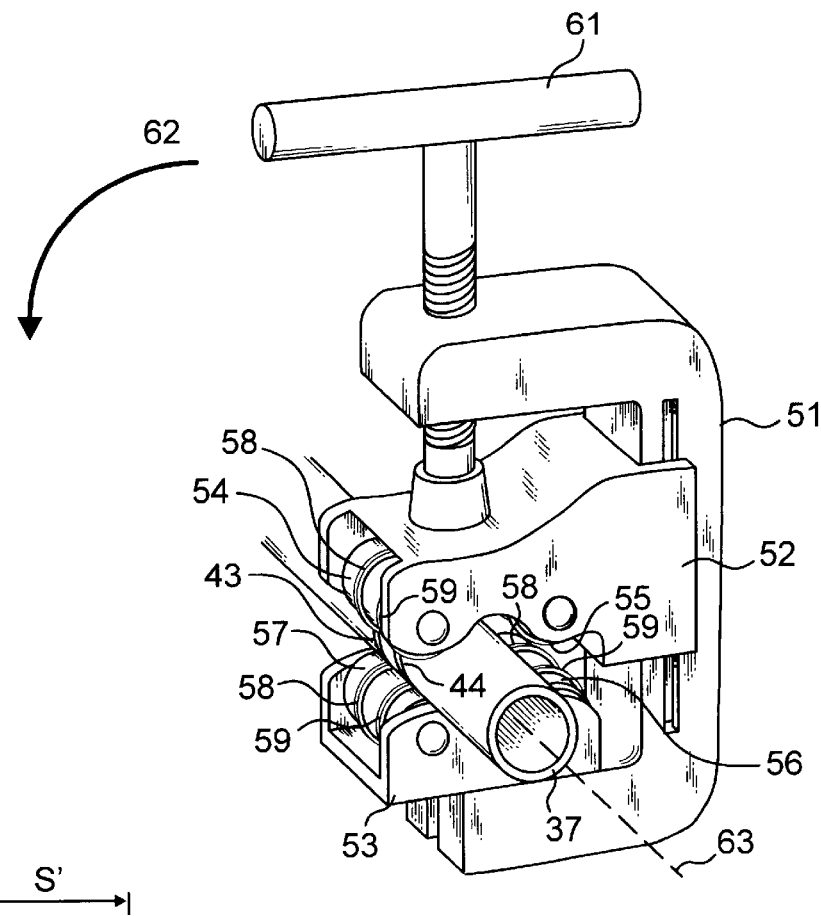
FIG. 5 is a perspective view of a scoring tool of the invention for scoring a pair of spaced apart channels on a pipe or tube end.
Figure 6:
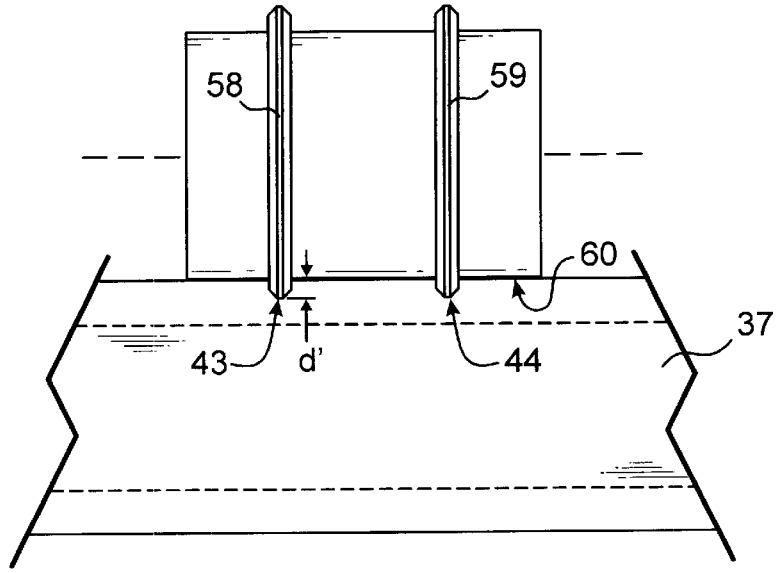
FIG. 6 is a partial side view of a cutting wheel of the scoring tool of FIG. 5.

As shown in FIGS. 5 and 6, the pair of circumferential channels are formed into the outer surface of the pipe end 37 using a pipe scoring tool 51 having a vertically slidable upper portion 52 and a horizontally slidable bottom portion 53, further having four cooperating pairs of side-by-side cutting wheels 54, 55, 56, 57. Each wheel has a pair of circular cutting bits 58, 59 parallely spaced apart a distance S' and having a width w' and a depth d'. The distance, widths and depths are selected based upon the gauge of pipe used. However, for most applications, a spacing of between about 0.5 and 0.75 inch and a width of between about 0.05 and 0.1 inch is preferable. The tool may be used to cut channels of any depth less than the bit depth d'. However, the tool is constructed to automatically generate optimum bit depth by cutting until the wheel surface 60 prevents further cutting by bearing against the outer surface of the pipe 37. The preferred depth should not exceed about 1/3 of the thickness of the pipe or tube wall, but must be adequate to nest the sealing rings, but not so deep as to impact the integrity of the pipe.

Figure 7:
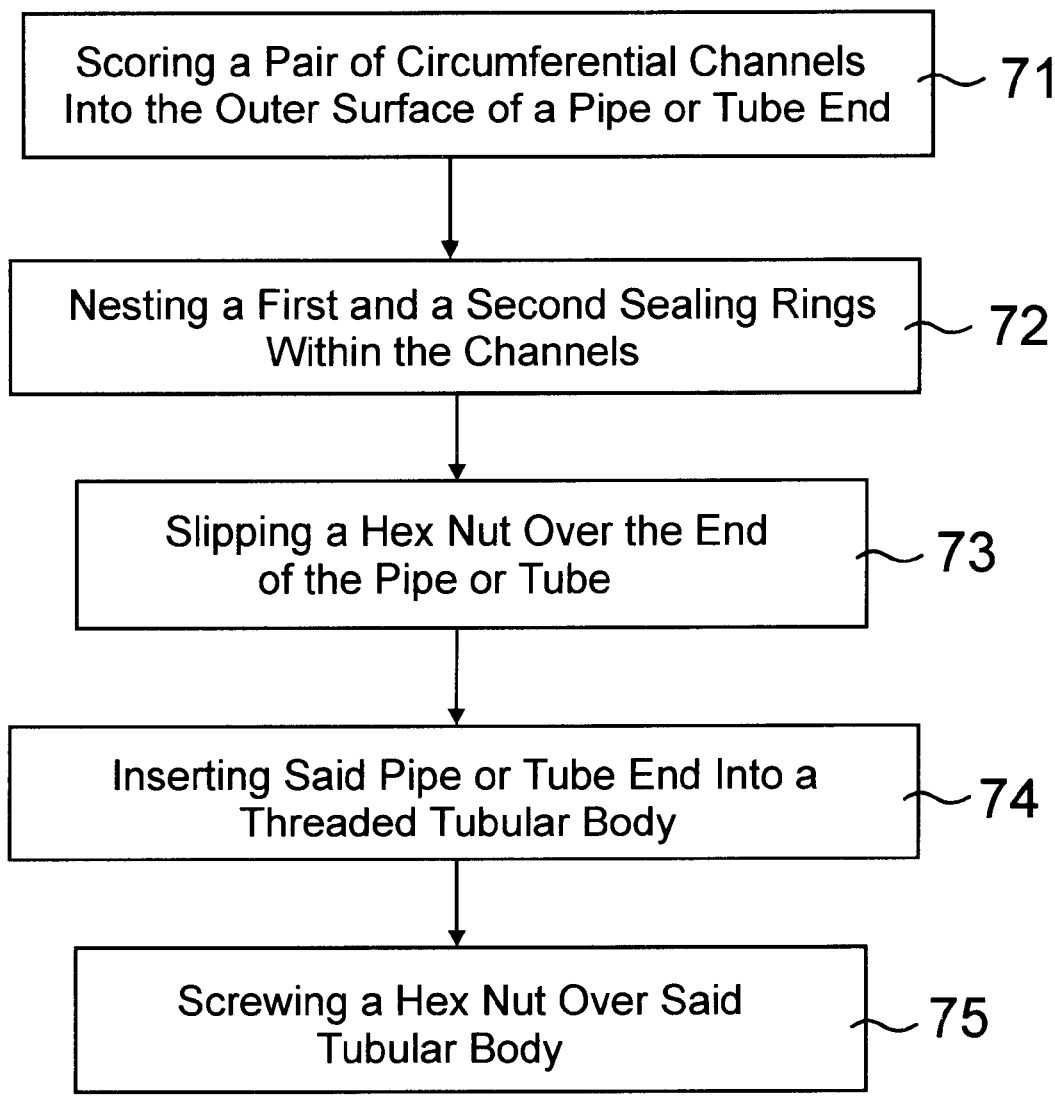
FIG. 7 is a flow chart showing the process of assembling the pipe-fitting.

The preferred process for using the tool to form a reliable pipe fitting will be described in reference to FIGS. 5 and 7. The tool is positioned on the pipe 37 so that the channel to be cut closest to the end of the pipe will be positioned approximately one inch from the end. The cutting bit are then brought into contact with the pipe by tightening the handle 61. The tool is then successively rotated 62 about the pipe's major axis 63 and re-tightened. These steps are repeated successively in order to score the channels into the pipe's outer surface 71. The two sealing rings are then nested 72 into the channels. The first sealing ring of a high temperature rubber is nested in the channel farthest from the pipe end. The second sealing ring made of substantially non-compressible material and preferably the same material as the pipe is nested in the channel closest to the pipe end. The fitting is the assembled by slipping the hex nut over the pipe end 73. It will be apparent to those skilled in the art that if the proximal opening of the nut has a diameter close to that of the outer diameter of the pipe, it may be necessary to slip the nut onto the pipe prior to nesting the sealing rings. The end of the pipe is then inserted into the female fitting 74 until it comes to rest against the small radial barrier. The nut is then cinched down 75 until it is tight. This can be accomplished by using either hand tools i.e. a wrench or vise or simply by hand-tightening.

The advantage of this fitting is that due to its low amount of deformation, it is capable of being re-used. This not only makes the fitting easy to install, but remove and re-install. Further, this fitting is compatible with off-the-shelf joints. Reusability greatly reduces waste and cost, thus providing an economic fittings for those who need large volumes of such fittings and allows fittings to be moved from site to site as necessary, as with the military.

While the preferred embodiments of the invention have been described, modifications can be made and other embodiments may be devised without departing from the spirit of the invention and the scope of the appended claims.

What is claimed is:

1. The combination of a pipe or tube of a given outer diameter and given inside diameter and a female fitting, for coupling to an end portion of said pipe or tube, said fitting comprising:

a tubular body including a proximal section, having an inside diameter slightly larger than said given outside diameter and defining an opening to be engaged by said end portion of the pipe, and a distal section;

said proximal section having an outer male threaded region tapering down toward said opening;

said region having a translating thread;

a part of said region having at least one slot running axially from said opening toward said distal section;

a nut having an inner female thread matingly commensurate with said translating thread;

a first sealing ring made from substantially incompressible material insertable into said opening; and wherein said first sealing ring is nested in a first circumferential channel in an outer surface of said end portion.

2. The combination of claim 1, which further comprises a second sealing ring of resilient material situated proximate to said first sealing ring.

3. The combination of a pipe or tube of a given outer diameter and a female fitting, for coupling to an end portion of said pipe or tube, said fitting comprising:

a tubular body having an inside diameter slightly larger than said given outside diameter and including a proximal section defining an opening to be engaged by said end portion of the pipe, and a distal section;

said proximal section having an outer male threaded region tapering down toward said opening, said region having a translating thread, a minimal threaded diameter and a tapering angle;

a part of said region having at least one slot running axially from said opening toward said distal section; and a nut having an inner female thread matingly commensurate with said translating thread;

wherein an outer surface area of said pipe or tube engaged by said tubular body is scored with at least one groove and a sealing ring male from incompressible material and shaped and dimensioned to nest into said groove.

\* \* \* \* \*